US006518333B2

(12) United States Patent
Liu et al.

(10) Patent No.: US 6,518,333 B2
(45) Date of Patent: Feb. 11, 2003

(54) FIRE RETARDANT LIGNO-CELLULOSIC COMPOSITE MATERIALS AND A METHOD FOR MAKING THE SAME

(75) Inventors: Feipeng Liu, Statham, GA (US); Paris W. Chen, Acworth, GA (US)

(73) Assignee: J.M. Huber Corporation, Edison, NJ (US)

(*) Notice: Subject to any disclaimer, the term of this patent is extended or adjusted under 35 U.S.C. 154(b) by 0 days.

(21) Appl. No.: 09/752,602

(22) Filed: Dec. 29, 2000

(65) Prior Publication Data

US 2002/0132883 A1 Sep. 19, 2002

(51) Int. Cl.[7] .................................................. C08L 1/02

(52) U.S. Cl. ......................... 524/13; 523/205; 523/206; 524/14; 252/607

(58) Field of Search ................................ 523/205, 206, 523/208; 524/13, 14; 252/607

(56) References Cited

U.S. PATENT DOCUMENTS

| | | | | | |
|---|---|---|---|---|---|
| 3,396,067 | A | | 8/1968 | Schafer | |
| 3,497,454 | A | | 2/1970 | Perizzolo | |
| 3,718,536 | A | | 2/1973 | Downs et al. | |
| 3,847,865 | A | | 11/1974 | Duggins | |
| 4,008,214 | A | | 2/1977 | Sobolev et al. | |
| 4,076,580 | A | | 2/1978 | Panusch et al. | |
| 4,097,648 | A | * | 6/1978 | Pringle | 523/208 |
| 4,126,473 | A | | 11/1978 | Sobolev et al. | |
| 4,130,458 | A | | 12/1978 | Moore et al. | |
| 4,363,739 | A | | 12/1982 | Okamura et al. | |
| 4,702,861 | A | | 10/1987 | Farnum et al. | |
| 5,126,076 | A | | 6/1992 | Graf et al. | |
| 5,435,954 | A | | 7/1995 | Wold | |
| 5,588,599 | A | | 12/1996 | Novak | |
| 5,723,020 | A | | 3/1998 | Robinson et al. | |
| 5,886,072 | A | * | 3/1999 | Linsky et al. | 524/405 |
| 6,040,045 | A | | 3/2000 | Alfonso et al. | |

FOREIGN PATENT DOCUMENTS

| | | | | |
|---|---|---|---|---|
| JP | 236517 | * | 9/1989 | 523/206 |

* cited by examiner

*Primary Examiner*—Peter Szekely
(74) *Attorney, Agent, or Firm*—Carlos Nieves; David Mitchell Goodrich

(57) ABSTRACT

A fire retardant ligno-cellulosic panel made from a mixture of (i) ligno-cellulosic material, (ii) at least one polymeric binder resin, and (iii) fire retardant solid particles containing fire retardant inorganic materials and a synthetic polymeric material, wherein the mixture is consolidated under heat and pressure to form the panel. Preferably, the fire retardant solid particles are a fine particle size sanding dust produced during the manufacture and finishing of synthetic particle filled resin materials.

16 Claims, 2 Drawing Sheets

FIRE RETARDANT LIGNO-CELLULOSIC COMPOSITE MATERIALS AND A METHOD FOR MAKING THE SAME

FIELD OF THE INVENTION

The present invention relates to ligno-cellulosic composite panels containing fire retardant solid particle additives, the panels being useful in the commercial and residential building industry. In particular, recycled solid surface sanding dust removed during the finishing of synthetic particle filled resins is employed as the fire retardant additive to economically produce the fire retardant composite wood panel.

BACKGROUND OF THE INVENTION

Polymeric composite materials made from synthetic polyester, plastic or acrylic resins are commonly used for various applications in the building, electrical and transportation industry. In the interest of safety, such synthetic materials have to fulfill strict flame retardation requirements arising from mandatory government regulations and industry-wide specifications.

Presently, compliance with flame retardation requirements is achieved by incorporating an array of fire retardant additives within the polymeric composites. For example, a common fire retardant, such as alumina trihydrate can be added to a liquid polyester resin or acrylic resin to form a synthetic marble or granite material commonly used in the building industry. The final synthetic granite product is a fire safe, man-made stone with a smooth, polished surface appearance.

Typically, the surface of such fire resistant particle filled resins is polished or smoothed by fine sanding and buffing of the composite surface. The by-product of this process is a very fine particle size sanding dust. Generally, the sanding dust cannot be re-used in the synthetic matrix because the small particle size of the dust will undesirably increase the viscosity of the synthetic matrix material. As a result, the typical practice is to dispose of this sanding dust in landfills. However, this by-product, fine particle size, sanding dust has excellent fire retardant properties due to the high content of fire retardant additives in the original composite, such as alumina trihydrate. Accordingly, there is a need in the industry to effectively recycle and utilize these by-product materials.

In the past, the forest product industry has continued to seek and develop cost-effective fire retardant chemicals for use in ligno-cellulosic composite materials, such as particleboard, fiberboard, oriented strand boards, agricultural straw board and gypsum boards. Typically, fire retardant requirements are achieved by manufacturing and incorporating many types of fire retardant materials in the ligno-cellulosic composite. Although numerous processes for the fire retarding of ligno-cellulosic materials exist, there is always a need for a more cost-effective, environmentally beneficial means to satisfy flame retardant specifications, while maintaining the quality and strength of the ligno-cellulosic materials.

SUMMARY OF THE INVENTION

In summary, the present invention relates to a fire retardant ligno-cellulosic panel comprising a mixture of (i) ligno-cellulosic material, (ii) at least one polymeric binder resin, and (iii) fire retardant solid particles comprising fire retardant inorganic materials and a synthetic polymeric material, wherein the mixture is consolidated under heat and pressure to form the panel. Preferably, the fire retardant solid particles are recycled surface sanding dust produced as a by-product during the sanding and buffing of the surfaces of synthetic particle filled polyester, plastic or acrylic resin materials, such as artificial stone, granite or marble composites.

A feature of the invention disclosed herein is to provide a ligno-cellulosic composite material which achieves a Class B fire rating (25<flame spread reading<75) in accordance with ASTM E-84, while maintaining acceptable strength properties. It is a further object of this invention to utilize a fire retardant by-product material, such as waste solid surface sanding dust, as an effective fire retardant additive for ligno-cellulosic composite materials.

DETAILED DESCRIPTION OF THE INVENTION

Figure 1:
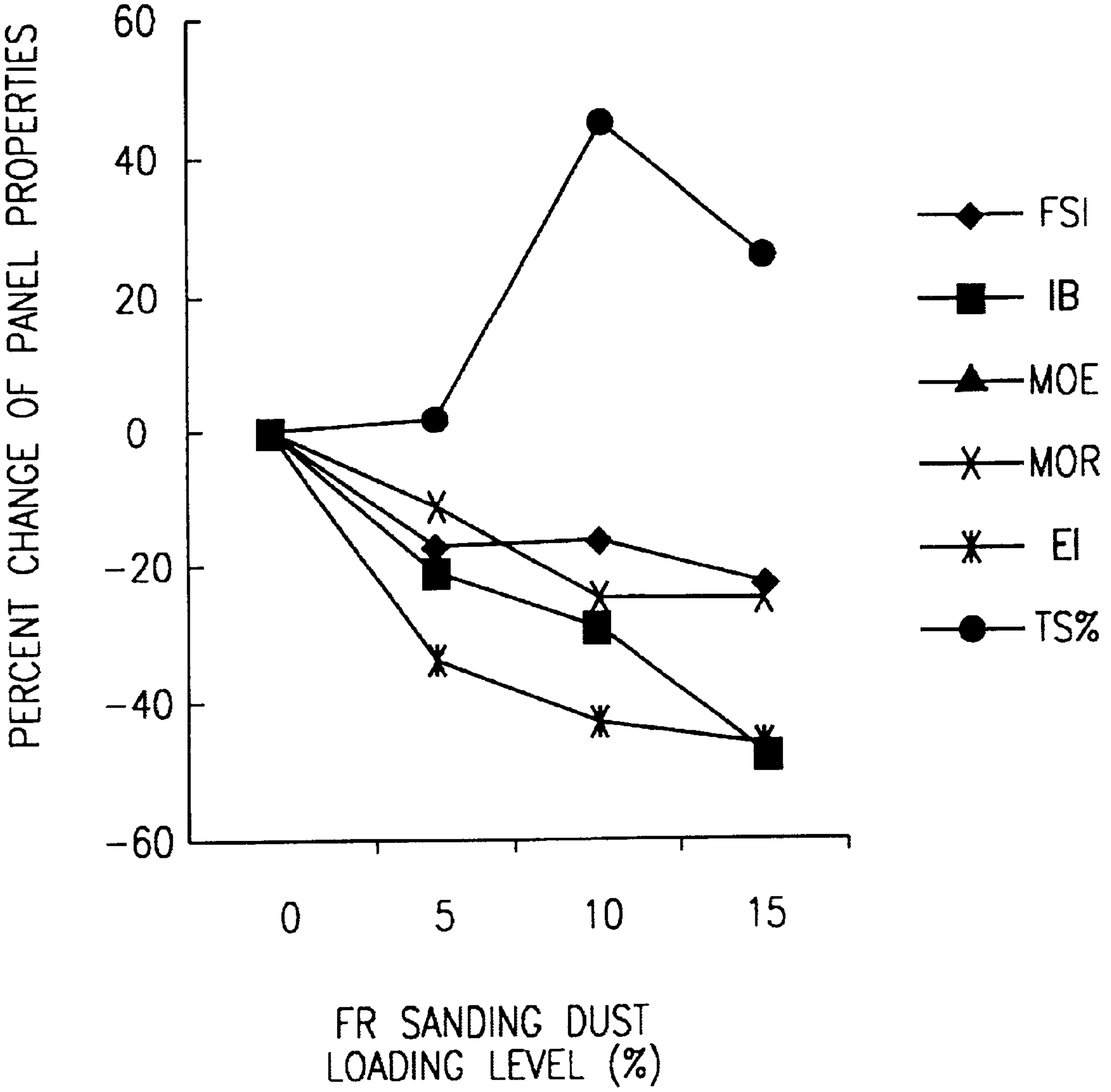
FIG. 1 is a graph illustrating the relationship between fire retardant loading levels (wt %) in wood panels versus the percent change in both the physical properties and flame spread index for the wood panels.

In a preferred mode of the invention, a fire retardant ligno-cellulosic composite material incorporates fire retardant solid particles as a fire retardant additive. A ligno-cellulosic composite includes composite materials such as oriented strand board, waferboard, chipboard, fiberboard, etc. Hereinafter only oriented strand board or OSB will be referred to, but it should be understood that the other "boards" may be substituted as equivalents.

Preferred ligno-cellulosic materials utilized in this invention are derived from naturally occurring hard or soft woods, singularly or mixed, whether such wood is green or dried. Typically, the raw wood starting materials, either virgin or reclaimed, are cut into strands, wafers or particles of desired size and shape. These ligno-cellulosic wood materials can be "green" (e.g., having a moisture content of 5–30% by weight) or dried, wherein the dried materials have a moisture content of about 2–10 wt %. Preferably, the ligno-cellulosic wood materials comprise dry wood parts having a moisture content of about 3 to 8 wt %. The wood materials are typically 0.01 to 0.5 inches thick, although thinner and thicker wood materials can be used in some applications. Moreover, these wood materials are typically less than one inch to several inches long and less than one inch to a few inches wide.

The commercial manufacture of OSB panels involves coating ligno-cellulosic wood materials with a polymeric thermosetting binder resin and wax additive, such that the wax and resin effectively coat the wood materials. Conventionally, the binder, wax and any other additives are applied to the wood materials by various spraying techniques. One such technique is to spray the wax, resin and additives upon the wood strands as the strands are tumbled in a drum blender. Binder resin and various additives applied to the wood materials are referred to herein as a coating, even though the binder and additives may be in the form of small particles, such as atomized particles or solid particles, which do not form a continuous coating upon the wood material. Fire retardant materials are incorporated either during or after coating of the wood materials. These materials may be added via spray or otherwise into the drum blender so that at least a portion of the fire retardant materials will coat the wood materials. The blended mixture is formed into either a random mat or oriented multi-layered mats. In particular, the coated wood materials are spread on a conveyor belt in a series of alternating layers, where one layer will have the flakes oriented generally in line with the conveyor belt, and the succeeding layer oriented generally perpendicular to the belt, such that alternating layers have coated wood materials oriented in generally a perpendicular fashion. Subsequently, the formed mats will be pressed under a hot press machine which fuses and binds together the coated wood materials to form a consolidated OSB panels of various thickness and size. Preferably, the panels of the invention are pressed for 2–5 minutes at a temperature of 350° F. (177° C.) to 480° F. (249° C.) and the resulting composite panels will have a density in the range of about 38–50 pcf (ASTM D1037-98) and a thickness of about 0.25 (¼") to about 1.5 (1½") inches.

Various polymeric resins, preferably thermosetting resins, may be employed as a binder for the ligno-cellulosic wood materials. Preferred binders include 4,4-diphenyl-methane diisocyanate (MDI) and phenol formaldehyde (powder or liquid), such as sold under the trademark RUBINATE 1840®, manufactured by Huntsman ICI and CP-460® manufactured by Tembec Company. The binder loading level is preferably in the range of 1–10 wt %, based upon the oven-dried wood weight, more preferably 2–5 wt %.

A wax additive is commonly employed to enhance the resistance of the OSB panels to absorb moisture. Preferred waxes are slack wax or a micro-crystalline wax. The wax loading level is preferably in the range of 0.5–2.5 wt %, based upon the oven-dried wood weight.

In accordance with the preferred embodiment of this invention, fire retardant solid particles are employed as a fire retardant during the manufacture of OSB panels. Preferably, the fire retardant particles described above comprise a fine particle size, solid surfacing or surface sheeting, sanding dust produced during the manufacture and finishing of synthetic particle filled resin materials. The fire retardant sanding dust is obtained from what otherwise is a waste product created during the manufacture of synthetic solid surface sheeting used to produce artificial stone, such as granite, marble and the like. For example, see U.S. Pat. Nos. 3,396,067 and 3,847,865, herein incorporated by reference. In addition, these synthetic particle filled resin materials may include decorative surface products, such as high-pressure laminates and decorative acrylics, such as those commonly used in kitchen countertops, commercial cabinetry, furniture, bowling lanes, mass transit interiors and guitars.

The preferred sanding dust is derived from homogeneous, thermoset polymer alloys, comprised of polyester and acrylic components and filled with inorganic fire retardant filler materials, such as alumina trihydrate. Alumina trihydrate (ATH), also known as aluminum hydroxide, is commonly used as both a filler and a fire retardant in these synthetic polymeric materials and can be identified by the chemical formulae of $Al(OH)_3$ or $Al_2O_3 \cdot 3H_2O$. As a result of its well-known fire retardant properties, the use of alumina trihydrate as a particle filler results in a highly flame resistant polymeric product.

In general, the manufacture of synthetic polymeric resin composite materials comprises mixing ATH and other conventional fillers with a synthetic plastic resin, such as polyester or acrylic resins, and the mixture is than sheet-formed and sanded for smoothness. The waste dust product created from sanding and polishing the solid sheeting materials is commonly land-filled.

The invention disclosed herein instead recovers the waste sanding dust generated during artificial stone and decorative surface manufacture and uses this waste dust as an additive in composite wood manufacture to impart fire retardation thereto. The fire retardant sanding dust is added to the OSB panel prior to panel consolidation in a range of less than or equal to 10 wt %, preferably less than or equal to 5 wt %. Preferably, the fire retardant sanding dust contains about 60–66 wt % ATH added into a liquid polyester or acrylic resin with about 1–2% catalyst. In particular, the waste sanding dust resulting from the manufacture of FOUNTAINHEAD® type products produced by Formica Corporation (formerly NEVAMAR® Decorative Products division of International Paper) are preferred. Such products are disclosed in greater detail in U.S. Pat. No. 6,040,045 incorporated by reference herein.

Regardless, the fine particle size, fire retardant particles, as disclosed herein, may comprise any fire retardant inorganic material and/or synthetic polymeric material, either derived from synthetic particle filled resins or other composite materials, synthetic or otherwise, as long as the particles exhibit fire retardant properties such that when incorporated into ligno-cellulosic composites, the particles provide fire retardant characteristics to the ligno-cellulosic composites within which they are contained.

The fire retardant solid particles may be incorporated into the OSB composite before, during or after the addition of the polymeric binder resin and wax additive material, but before compression. When incorporated prior to the addition of binder resin, the fire retardant particles will directly contact and coat the wood materials. However, due to the particle coating of the wood materials, subsequently added binder resin will have less opportunity to contact the wood materials, resulting in reduced bonding strength of the final product. On the other hand, addition of the fire retardant particles during or after application of the binder resin and wax, results in the fire retardant particles becoming embedded in the resin matrix, thereby requiring a larger amount of fire retardant particles to achieve favorable flame spread reading. In a preferred embodiment, the fire retardant particles are added to the ligno-cellulosic composite subsequent to the addition of the polymeric binder resin and wax. Further, it is preferred that these fire retardant particles have a particle size of less than or equal to 30 microns, more preferably a particle size in the range of 1–30 microns (ASTM D 3360).

In particular, the preferred OSB panel comprises (i) 70–90 wt % oven-dried ligno-cellulosic material, preferably 80–90 wt %, (ii) less than or equal to 10 wt % recycled sanding dust, preferably less than or equal to 5 wt %, (iii) 1.5–10 wt % of at least one polymeric binder, preferably 2–5 wt %, and (iv) 0.9–2.5 wt % additional additives, e.g., wax.

The following examples serve to better illustrate, but not limit, some of the preferred embodiments of the invention.

Ligno-cellulosic materials comprising pre-dried wood particles, flakes and strands were first mixed with a slack wax followed by addition of a polymeric thermosetting resin in a drum blender to coat the ligno-cellulosic materials. Subsequently, by-product solid surface sanding dust, removed during the manufacture of Formica Corporation's FOUNTAINHEAD® type products, was added into the drum blender and blended for about three (3) minutes. The coated ligno-cellulosic materials were removed from the drum blender and formed into oriented multi-layered mats. Thereafter, the formed mats were compressed using a laboratory hot press machine to produce the oriented strand board (OSB) panels utilized in the following comparative analysis. Specific manufacturing parameters are listed in Table 1 below.

TABLE 1

| Panel Manufacturing Parameters of Tested OSB | |
|---|---|
| Panel Dimension | 21" × 21" |
| Target Density | 46 (pcf) |
| Flake orientation | Random |
| Furnish | Southern pine flakes and strands |
| Moisture content | 3–5% |
| Slack wax content | 2% |
| Resin Type | Polymeric MDI or phenol-formaldehyde resin |
| Press Temperature | 410° F. (210° C.) |
| Press time | 180 (second) |

In accordance with the manufacturing process described above, experimental OSB panels were produced for each of the 15 design conditions (Experimental Nos. 1–15) listed below in Table 2. Three OSB panels were produced for each design condition, for a total of 45 experimental OSB panels.

TABLE 2

| Experimental No. | OSB nominal Thickness (in.) | Type of Resin | Resin Loading Level (%) | FR Dust Loading % |
|---|---|---|---|---|
| 1 | ⅜" | MDI | 2 | 0 |
| 2 | | | 2 | 5 |
| 3 | | | 2 | 10 |
| 4 | | | 2 | 15 |
| 5 | | | 3.5 | 0 |
| 6 | | | 3.5 | 5 |
| 7 | | | 3.5 | 10 |
| 8 | | | 3.5 | 15 |
| 9 | | | 5 | 0 |
| 10 | | | 5 | 5 |
| 11 | | | 5 | 10 |
| 12 | | | 5 | 15 |
| 13 | ½" | MDI | 3.5 | 10 |
| 14 | ⅜" | Powder PF resin | 3.5 | 10 |
| 15 | ⅜" | Liquid PF resin | 3.5 | 10 |

The OSB samples were subsequently cut into specific sizes and the following physical properties measured using the test procedures disclosed in ASTM D1037-98:

(1) Modulus of elasticity (MOE)

(2) Modulus of rupture (MOR)

(3) Internal Bonding (IB)

(4) 24 Hour thickness swelling (TS)

(5) 24 Hour Water Absorption (6) Density of the tested panels (7) Bending Stiffness (Modulus of elasticity * moment of inertia=EI)

Although there is no single standard test to determine fire resistance of various construction materials, flame spread ratings based upon ASTM E-84 have acquired common acceptance by various regulatory agencies. Individual Class Ratings represent a particular range of flame spread readings produced in accordance with ASTM E-84 standards. These Class Ratings are illustrated below.

| Flame Spread Reading | Class Rating |
|---|---|
| 0–25 | A |
| 25–75 | B |
| 75–135 | C |

The test procedure of ASTM E-84 employs a 25-foot tunnel in which flame spread is carefully monitored on a large sample under standardized test conditions. However, such large-scale tests are seldom practical during the development and modification of fire retardant construction materials. Accordingly, ASTM D-3806 provides the relative flame spread of experimental materials using a smaller 2-foot tunnel to predict the burning properties of wood and composite wood products. Proper calibration of the 2-foot tunnel will result in flame spread readings indicative of those obtained with a large specimen in the 25-foot E-84 tunnel. Accordingly, the flame spread reading obtained using a 2-foot tunnel, as described in D-3806, is commonly employed to determine the Class Rating of various construction materials.

In this regard, the fire retardant properties for each of the 45 experimental OSB panels was determined by calculating the flame spread reading (also referred to as flame spread index) using a 2-foot tunnel-testing machine in accordance with the ASTM D3806-84 standard. In the calibration, a cement-fiberboard is used as the flame zero panel and a standard red oak panel serves as an indicator of 100% flame spread.

Table 3 below summarizes the physical properties and flame retardant performance for each of the 15 OSB design conditions. The values contained in Table 3 represent the means value determined from the results for the three OSB panels produced and tested for each design condition.

TABLE 3

| Exp. Run No. | Density (pcf) | MOR (psi) | MOE (psi) | IB (psi) | TS (%) | WA (%) | FSR |
|---|---|---|---|---|---|---|---|
| 1 | 42.5 | 3622 | 480360 | 90 | 27.8 | 45.2 | 82.0 |
| 2 | 43.0 | 4459 | 636000 | 114 | 15.6 | 30.7 | 100 |
| 3 | 43.6 | 4228 | 586100 | 167 | 13.8 | 30.0 | 97.4 |
| 4 | 50.3 | 4081 | 487000 | 53 | 25.1 | 45.4 | 82.0 |
| 5 | 47.2 | 4053 | 575000 | — | — | — | 100 |
| 6 | 40.0 | 2729 | 437000 | 53 | 27.4 | 34.9 | 74 |
| 7 | 44.0 | 2200 | 337000 | 34 | 38.8 | 54.7 | 77 |
| 8 | 46.6 | 4738 | 577000 | 40 | 37.9 | 50.7 | 67 |
| 9 | 45.9 | 3454 | 480000 | 134 | 17 | 30.0 | 89 |
| 10 | 48.0 | 4293 | 550000 | 108 | 18.5 | 32.8 | 82 |
| 11 | 51.0 | 5316 | 655000 | 73 | 23.6 | 40.7 | 79 |
| 12 | 47.7 | 5031 | 620000 | 141 | 13.6 | 26.5 | 67 |
| 13 | 52.4 | 5397 | 617000 | 153 | 13.4 | 17.3 | 74 |
| 14 | 44.4 | 1416 | 253000 | 136 | 10.2 | 16.5 | 72 |
| 15 | 44.7 | 1677 | 269000 | — | 48.1 | 81.8 | 79 |

Multi-analysis of variance was applied to Experimental Run numbers 1–12 to obtain Tables 4 and 5 below. Table 4 illustrates the influence of solid surface sanding dust loading on panel performance. Results illustrated in Table 4 are plotted in FIG. 1. FIG. 1 demonstrates the relationship between fire retardant loading levels in the wood panels and the percent change in both the physical properties and flame spread index.

TABLE 4

Influence of Solid Sanding Dust (%) on Panel properties

| Dust (%) | Density (pcf) | FSI | IB (psi) | MOE (psi) | MOR (psi) | EI lb-inch$^2$ | TS % (%) |
|---|---|---|---|---|---|---|---|
| 0 | 43.0 | 93.0 | 137.5 | 650708 | 4877.5 | 15001 | 19.1 |
| 5 | 48.0 | 77.0 | 108.9 | 562370 | 4330.1 | 9973 | 19.36 |
| 10 | 47.0 | 78.0 | 97.11 | 504435 | 3664 | 8497 | 27.63 |
| 15 | 48.0 | 72.0 | 71.5 | 466342 | 3634 | 8023 | 23.9 |

As weight percent of the fire retardant sanding dust contained in the OSB panels increased, IB, MOR, and MOE quality decreased proportionally and TS increased. However, as fire retardant dust levels were increased, the flame spread reading of the OSB panels decreased, although loading levels of greater than 5% seemed to have had an insignificant effect on flame spread reading.

Figure 2:
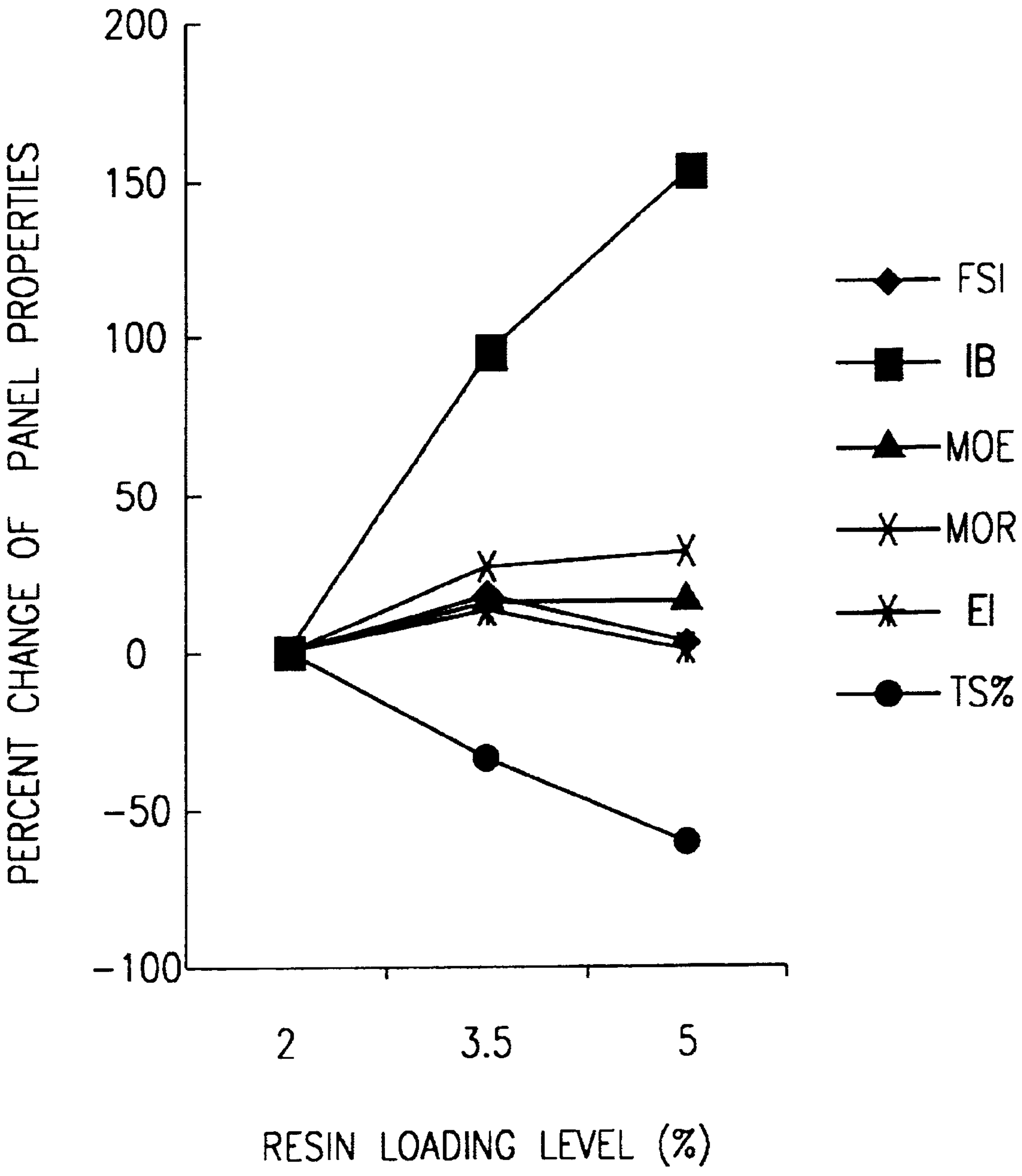
FIG. 2 is a graph illustrating the relationship between polymeric binder resin loading levels (wt %) wood panels versus the percent change in both the physical properties and flame spread index for the wood panels.

Table 5 illustrates the influence of resin loading levels on panel performance. Results illustrated in Table 5 are plotted in FIG. 2. FIG. 2 demonstrates the relationship between resin loading levels and the percent change in both the physical properties of the panel and flame spread index.

TABLE 5

Influence of MDI Resin Application level on Panel Properties

| MDI resin (%) | Density (pcf) | FSI (%) | IB (psi) | MOE (psi) | MOR (psi) | EI lb-inch$^2$ | TS % (%) |
|---|---|---|---|---|---|---|---|
| 2 | 45.0 | 75.0 | 56.9 | 490533 | 3460 | 9933 | 32.97 |
| 3.5 | 46.0 | 88.0 | 111 | 577940 | 4395 | 11278 | 21.77 |
| 5 | 48.7 | 77.0 | 143.3 | 569418 | 4525 | 9900 | 12.75 |

FIG. 2 illustrates that increasing the MDI resin loading level will result in a significant improvement in panel bonding strength (IB). In particular, when the MDI loading level was increased from 2% to 5%, the internal bonding strength increased by approximately 150%, while twenty-four (24) hour thickness swelling decreased by more than 50%. However, this increase in MDI resin loading had little, if any, effect upon flame spread reading.

As demonstrated from this data, a synergistic effect results at particular fire retardant sanding dust and resin loading levels. Accordingly, panels may be produced using the fire retardant sanding dust as disclosed herein to produce ligno-cellulosic composites which satisfy ASTM E-84 class B level (FSR<75 and FSR>25). Meanwhile, these FSR levels can be achieved with only slight reduction in panel strength.

What is claimed is:

1. A fire retardant ligno-cellulosic panel comprising a mixture of:

(i) ligno-cellulosic wood material, (ii) at least one polymeric binder resin, and (iii) fire retardant solid particles comprising fire retardant inorganic materials and synthetic polymeric materials, the particles having a size of less than 30 microns;

wherein said mixture is consolidated under heat and pressure to form the panel.

2. The fire retardant ligno-cellulosic panel of claim 1 wherein the fire retardant inorganic material comprises alumina trihydrate.

3. The fire retardant ligno-cellulosic panel of claim 1 wherein said particle filled resin composite is synthetic solid surface sheeting.

4. The fire retardant ligno-cellulosic panel of claim 1 wherein said fire retardant solid particles comprise 60–66 wt % alumina trihydrate.

5. The fire retardant ligno-cellulosic panel of claim 1 wherein said particle filled resin composite comprises at least one of a synthetic polyester resin or acrylic resin material.

6. The fire retardant ligno-cellulosic panel of claim 1 wherein said polymeric binder resin comprises 4,4-diphenyl-methane diisocyanate.

7. The fire retardant ligno-cellulosic panel of claim 1 wherein said polymeric binder resin comprises phenol formaldehyde.

8. The fire retardant ligno-cellulosic panel of claim 1 wherein the ligno-cellulosic composite contains 70–93 wt % ligno-cellulosic wood materials, 1.5–10 wt % thermoset binder, less than or equal to 10 wt % fire retardant solid particles and further comprises 0.9–2.5 wt % of a wax additive.

9. The fire retardant ligno-cellulosic panel of claim 1 wherein the ligno-cellulosic composite contains 80–90 wt % ligno-cellulosic wood materials, 2–5 wt % thermoset binder, less than or equal to 5 wt % fire retardant solid particles and further comprises 1–2 wt % of a wax additive.

10. The fire retardant ligno-cellulosic panel of claim 8 or 9 wherein the ligno-cellulosic composite has 25<Flame Spread Reading<75.

11. A method for producing a fire-retardant ligno-cellulosic composite panel comprising the steps of:

(a) mixing (i) ligno-cellulosic wood materials, (ii) at least one polymeric binder resin, and (iii) fire retardant solid particles comprising fine particle size sanding dust derived from a synthetic, fire retardant, particle filled resin composite, the fire retardant solid particles having a particle size of less than 30 microns; and (b) consolidating said mixture under heat and pressure to form a composite panel.

12. A method according to claim 11 wherein said fire retardant particle filled resin comprises alumina trihydrate.

13. A method according to claim 11 wherein said fire retardant particle filled resin comprises 60–66 wt % alumina trihydrate and has a particle size less than 30 microns.

14. A method according to claim 11 wherein said fine particle size sanding dust is a by-product produced during the sanding of synthetic solid surface sheeting.

15. A method according to claim 11 wherein said fire-retardant ligno-cellulosic composite has 25<Flame Spread Reading<75.

16. A method according to claim 11 wherein during the mixing step, said ligno-cellulosic wood materials become coated with said binder resin and at least a portion of said fire retardant particles.

* * * * *